United States Patent
Lee et al.

(10) Patent No.: US 10,153,914 B2
(45) Date of Patent: Dec. 11, 2018

(54) METHOD AND APPARATUS FOR INDICATING USAGE OF MBSFN AREA IN WIRELESS COMMUNICATION SYSTEM

(71) Applicant: LG ELECTRONICS INC., Seoul (KR)

(72) Inventors: Jaewook Lee, Seoul (KR); Youngdae Lee, Seoul (KR); Sangwon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/314,747

(22) PCT Filed: Jun. 4, 2015

(86) PCT No.: PCT/KR2015/005612
§ 371 (c)(1),
(2) Date: Nov. 29, 2016

(87) PCT Pub. No.: WO2015/190750
PCT Pub. Date: Dec. 17, 2015

(65) Prior Publication Data
US 2017/0207924 A1    Jul. 20, 2017

Related U.S. Application Data

(60) Provisional application No. 62/009,322, filed on Jun. 8, 2014.

(51) Int. Cl.
*H04L 12/18* (2006.01)
*H04W 52/02* (2009.01)
(Continued)

(52) U.S. Cl.
CPC ............ *H04L 12/189* (2013.01); *H04W 4/70* (2018.02); *H04W 52/0209* (2013.01);
(Continued)

(58) Field of Classification Search
CPC ............ H04L 12/189; H04W 52/0225; H04W 52/0209; H04W 4/70; H04W 52/0216;
(Continued)

(56) References Cited

U.S. PATENT DOCUMENTS

2010/0315987 A1    12/2010  Kuo
2011/0194428 A1     8/2011  Wang et al.
(Continued)

FOREIGN PATENT DOCUMENTS

WO    WO 2013/108219 A1    7/2013

OTHER PUBLICATIONS

Nguyen et al. "Service Continuity for eMBMS in LTE/LTE-Advanced Network: Standard Analysis and Supplement", CCNC 2014, Jan. 10-13, 2014.

*Primary Examiner* — Omar J Ghowrwal
(74) *Attorney, Agent, or Firm* — Birch, Stewart, Kolasch & Birch, LLP

(57) ABSTRACT

A method for indicating usage of a multicast-broadcast single-frequency network (MBSFN) area in a wireless communication system is provided. A network indicates an identifier indicating usage of an MBSFN area via system information to a user equipment (UE). The UE determines whether to read a multicast control channel (MCCH) corresponding to the MBSFN area according to the received identifier.

5 Claims, 5 Drawing Sheets

(51) Int. Cl.
*H04W 4/70* (2018.01)
*H04W 72/00* (2009.01)
*H04W 88/02* (2009.01)

(52) U.S. Cl.
CPC ... *H04W 52/0216* (2013.01); *H04W 52/0219* (2013.01); *H04W 52/0225* (2013.01); *H04W 72/005* (2013.01); *H04W 88/02* (2013.01); *Y02D 70/00* (2018.01); *Y02D 70/1224* (2018.01); *Y02D 70/1226* (2018.01); *Y02D 70/1242* (2018.01); *Y02D 70/1262* (2018.01); *Y02D 70/142* (2018.01); *Y02D 70/146* (2018.01); *Y02D 70/21* (2018.01); *Y02D 70/23* (2018.01); *Y02D 70/24* (2018.01)

(58) Field of Classification Search
CPC ........... H04W 52/0219; H04W 72/005; H04W 88/02; Y02D 70/1262; Y02D 70/146; Y02D 70/1226; Y02D 70/23; Y02D 70/142; Y02D 70/1224; Y02D 70/1242; Y02D 70/24; Y02D 70/21; Y02D 70/00
See application file for complete search history.

(56) References Cited

U.S. PATENT DOCUMENTS

| | | | |
|---|---|---|---|
| 2011/0292858 A1* | 12/2011 | Jones | H04W 72/005 370/312 |
| 2012/0039237 A1 | 2/2012 | Liang et al. | |
| 2012/0093060 A1* | 4/2012 | Huschke | H04W 48/12 370/312 |
| 2013/0155954 A1* | 6/2013 | Wang | H04W 4/70 370/328 |
| 2013/0308572 A1* | 11/2013 | Sayana | H04W 72/048 370/329 |
| 2017/0317842 A1* | 11/2017 | Yu | H04W 28/0215 |

* cited by examiner

[Fig. 1]
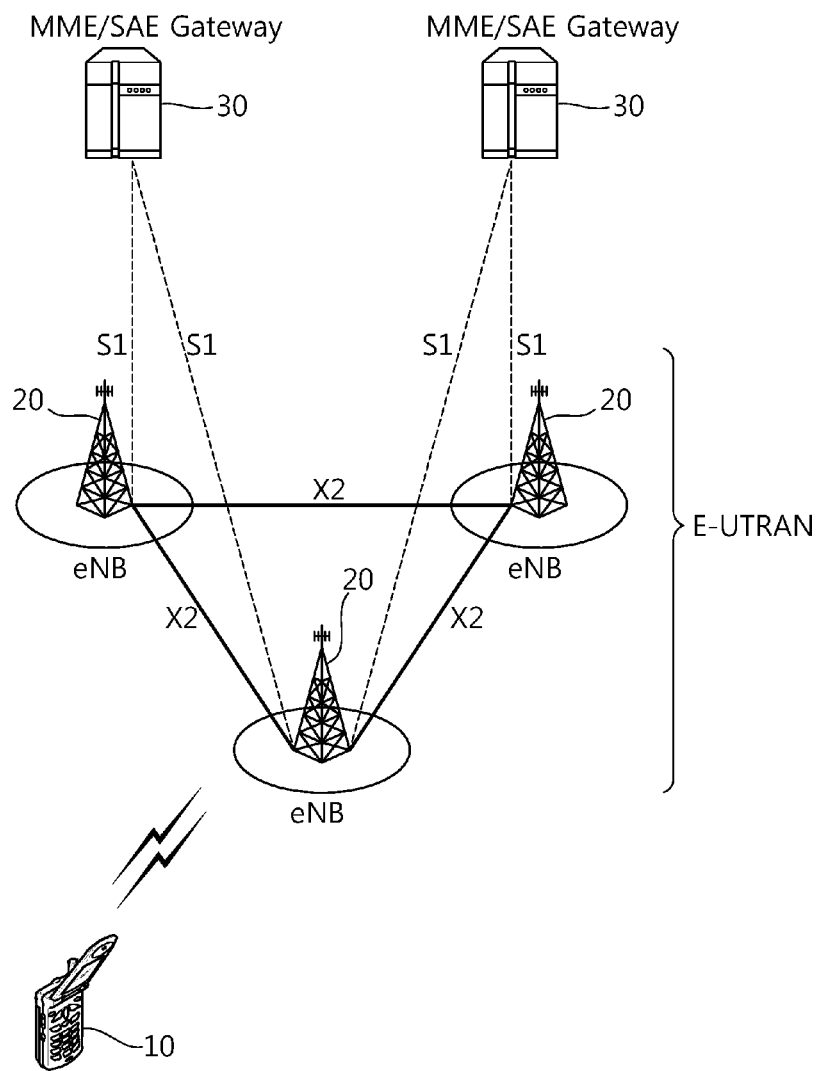

[Fig. 2]
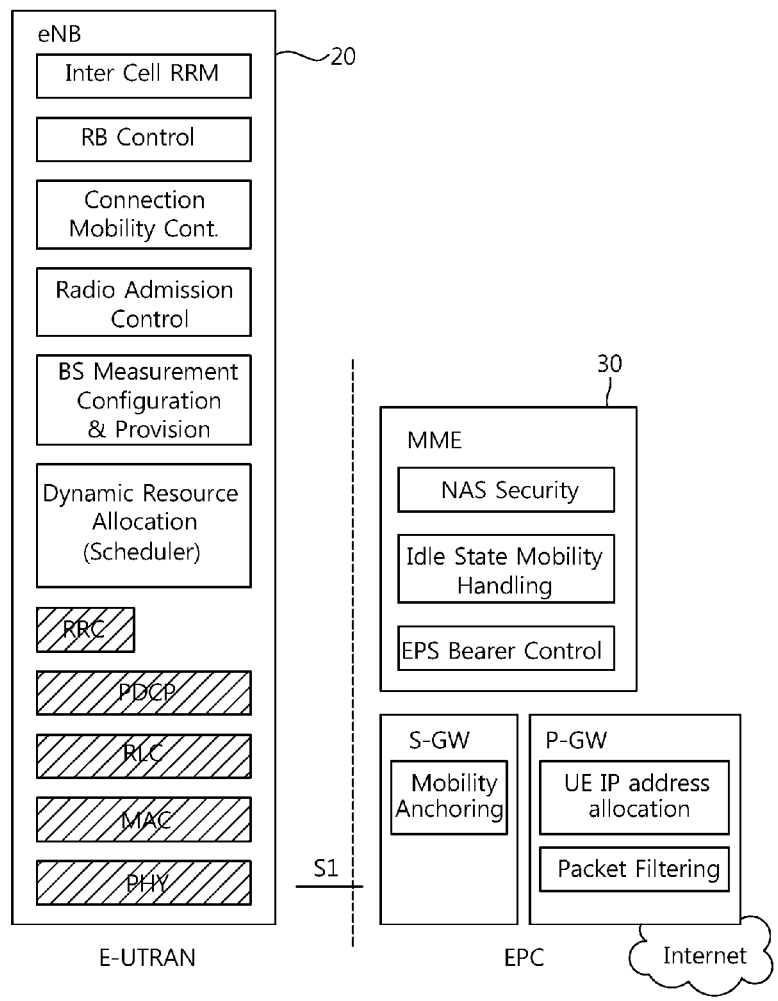
[Fig. 3]
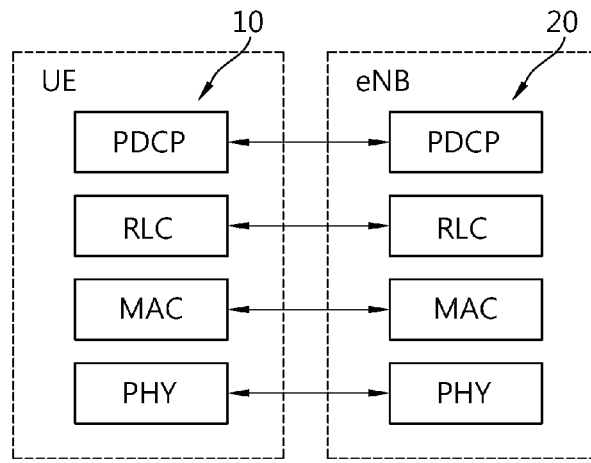

[Fig. 4]
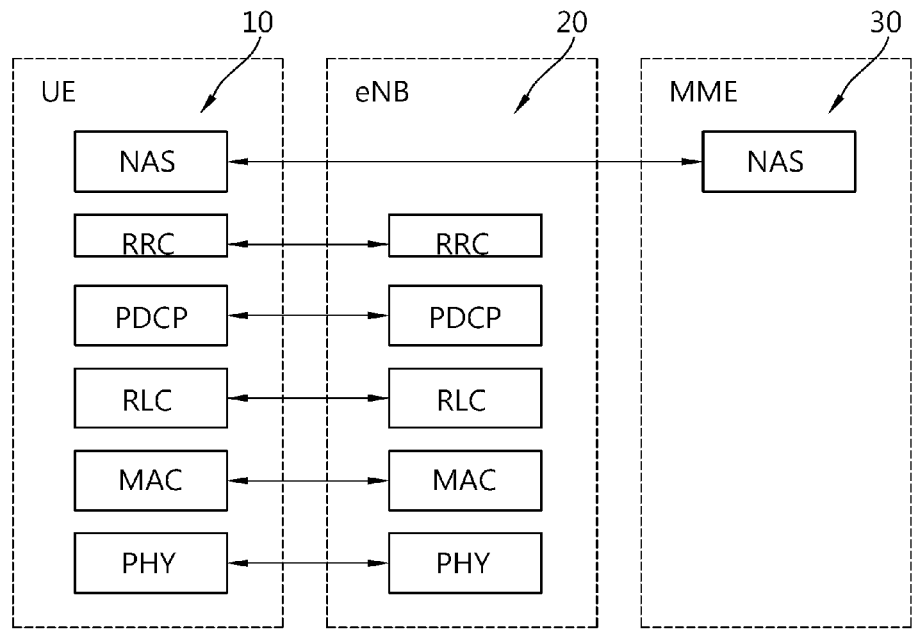
[Fig. 5]
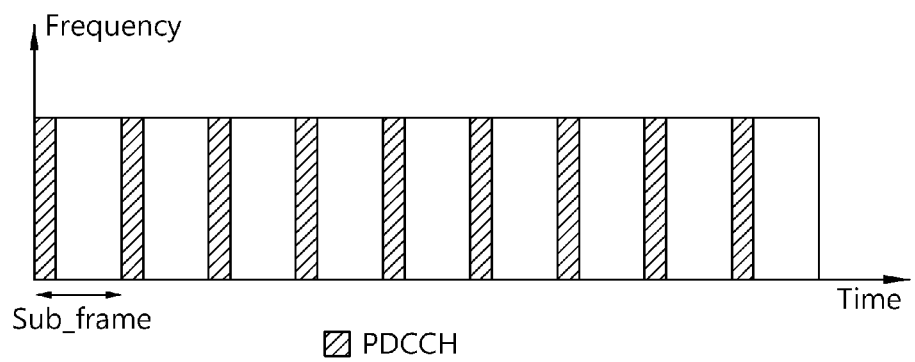

[Fig. 6]
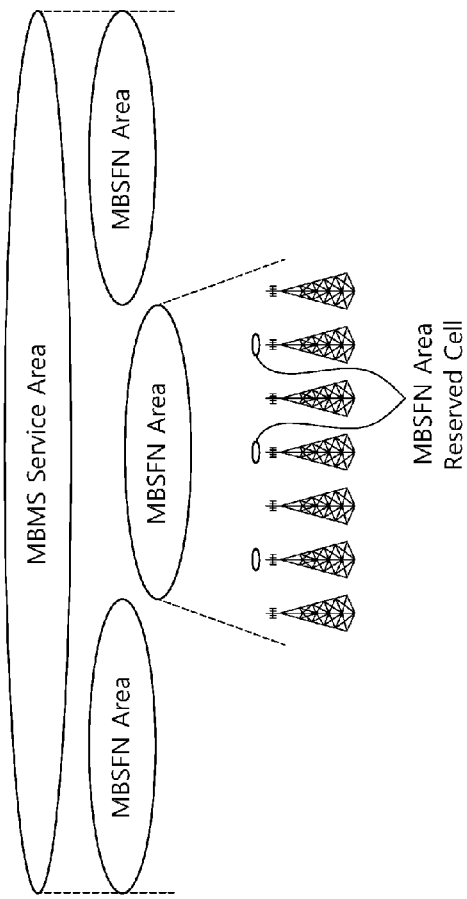
[Fig. 7]
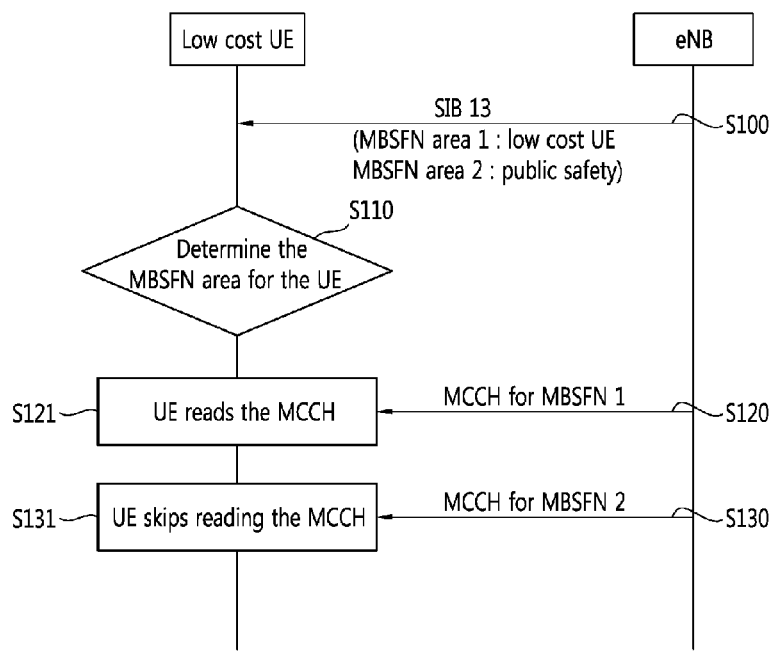

[Fig. 8]
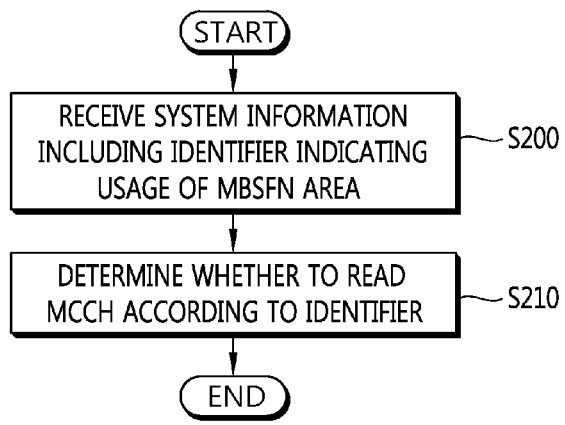
[Fig. 9]
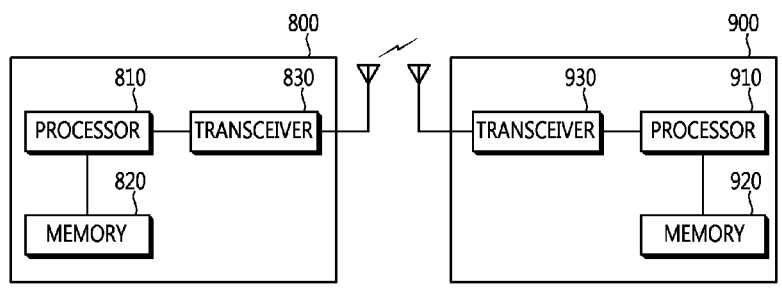

METHOD AND APPARATUS FOR INDICATING USAGE OF MBSFN AREA IN WIRELESS COMMUNICATION SYSTEM

CROSS REFERENCE TO RELATED APPLICATIONS

This application is the National Phase of PCT/KR2015/005612 filed on Jun. 4, 2015, which claims priority under 35 U.S.C. § 119(e) to U.S. Provisional Application No. 62/009,322 filed on Jun. 8, 2014, all of which are hereby expressly incorporated by reference into the present application.

TECHNICAL FIELD

The present invention relates to wireless communications, and more particularly, to a method and apparatus for indicating usage of a multicast-broadcast single-frequency network (MBSFN) area in a wireless communication system.

BACKGROUND ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

The 3GPP LTE can provide a multimedia broadcast multicast service (MBMS). The MBMS is a service which simultaneously transmits data packets to multiple users. If a specific level of users exists in the same cell, the respective users can be allowed to share necessary resources so that the plurality of users can receive the same multimedia data, thereby increasing resource efficiency. In addition, a multimedia service can be used with a low cost from the perspective of users.

Low complexity UEs are targeted to low-end (e.g., low average revenue per user, low data rate, delay tolerant) applications, e.g., some machine-type communications (MTCs). The low complexity UEs may support MBMS, and there may be MBMS services specified to the lost complexity UEs. In this case, a method for indicating usage of a multicast-broadcast single-frequency network (MBSFN) area which provides the MBMS services to which the lost complexity UE is interested may be required.

DISCLOSURE OF INVENTION

Technical Problem

The present invention provides a method and apparatus for indicating usage of a multicast-broadcast single-frequency network (MBSFN) area in a wireless communication system. The present invention provides a method and apparatus for providing an identifier for the usage of the MBSFN area via system information.

Solution to Problem

In an aspect, a method for indicating, by a user equipment (UE), usage of a multicast-broadcast single-frequency network (MBSFN) area in a wireless communication system is provided. The method includes receiving system information including an identifier indicating usage of an MBSFN area, and determining whether to read a multicast control channel (MCCH) corresponding to the MBSFN area according to the received identifier.

In another aspect, a user equipment (UE) includes a memory, a transceiver, and a processor coupled to the memory and the transceiver, and configured to control the transceiver to receive system information including an identifier indicating usage of a multicast-broadcast single-frequency network (MBSFN) area, and determine whether to read a multicast control channel (MCCH) corresponding to the MBSFN area according to the received identifier.

Advantageous Effects of Invention

The UE can save power and receive interested MBMS service more quickly.

BRIEF DESCRIPTION OF DRAWINGS

FIG. 1 shows LTE system architecture.

FIG. 2 shows a block diagram of architecture of a typical E-UTRAN and a typical EPC.

FIG. 3 shows a block diagram of a user plane protocol stack of an LTE system.

FIG. 4 shows a block diagram of a control plane protocol stack of an LTE system.

FIG. 5 shows an example of a physical channel structure.

FIG. 6 shows MBMS definitions.

FIG. 7 shows an example of a method for indicating usage of an MBSFN area according to an embodiment of the present invention.

FIG. 8 shows another example of a method for indicating usage of an MBSFN area according to an embodiment of the present invention.

FIG. 9 shows a wireless communication system to implement an embodiment of the present invention.

MODE FOR THE INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16 m is an evolution of IEEE 802.16 e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink LTE-advance (LTE-A) is an evolution of the 3GPP LTE.

For clarity, the following description will focus on the LTE-A. However, technical features of the present invention are not limited thereto.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e. between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARM). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

MBMS is described. It may be referred to Section 15 of 3GPP TS 36.300 V11.7.0 (2013-09) and Section 5.8 of 3GPP TS 36.331 V11.5.0 (2013-09).

FIG. 6 shows MBMS definitions. For MBMS, the following definitions may be introduced.

Multicast-broadcast single-frequency network (MBSFN) synchronization area: This is an area of the network where all eNBs can be synchronized and perform MBSFN transmissions. MBSFN synchronization areas are capable of supporting one or more MBSFN areas. On a given frequency layer, an eNB can only belong to one MBSFN synchronization area. MBSFN synchronization areas are independent from the definition of MBMS service areas.

MBSFN transmission or a transmission in MBSFN mode: This is a simulcast transmission technique realized by transmission of identical waveforms at the same time from multiple cells. An MBSFN transmission from multiple cells within the MBSFN area is seen as a single transmission by a UE.

MBSFN area: an MBSFN area consists of a group of cells within an MBSFN synchronization area of a network, which are coordinated to achieve an MBSFN transmission. Except for the MBSFN area reserved cells, all cells within an MBSFN area contribute to the MBSFN transmission and advertise its availability. The UE may only need to consider a subset of the MBSFN areas that are configured, i.e., when it knows which MBSFN area applies for the service(s) it is interested to receive.

MBSFN area reserved cell: This is a cell within a MBSFN area which does not contribute to the MBSFN transmission. The cell may be allowed to transmit for other services but at restricted power on the resource allocated for the MBSFN transmission.

Synchronization sequence: Each synchronization protocol data unit (SYNC PDU) contains a time stamp which indicates the start time of the synchronization sequence. For an MBMS service, each synchronization sequence has the same duration which is configured in the broadcast and multicast service center (BM-SC) and the multicell/multicast coordination entity (MCE).

Synchronization period: The synchronization period provides the time reference for the indication of the start time of each synchronization sequence. The time stamp which is provided in each SYNC PDU is a relative value which refers to the start time of the synchronization period. The duration of the synchronization period is configurable.

The following principles govern the MCCH structure:

One MBSFN area is associated with one MCCH and one MCCH corresponds to one MBSFN area.

The MCCH is sent on MCH.

MCCH consists of a single MBSFN area configuration RRC message which lists all the MBMS services with ongoing sessions and an optional MBMS counting request message.

MCCH is transmitted by all cells within an MBSFN area, except the MBSFN area reserved cells.

MCCH is transmitted by RRC every MCCH repetition period.

MCCH uses a modification period.

A notification mechanism is used to announce changes of MCCH due to either session start or the presence of an MBMS counting request message. The notification is sent periodically throughout the modification period preceding the change of MCCH, in MBSFN subframes configured for notification. The downlink control information (DCI) format 1C with MBMS radio network temporary identity (M-RNTI) is used for notification and includes an 8-bit bitmap to indicate the one or more MBSFN area(s) in which the MCCH change(s). The UE monitors more than one notification subframe per modification period. When the UE receives a notification, it acquires the MCCH at the next modification period boundary.

The UE detects changes to MCCH which are not announced by the notification mechanism by MCCH monitoring at the modification period.

In general, the control information relevant only for UEs supporting MBMS is separated as much as possible from unicast control information. Most of the MBMS control information is provided on a logical channel specific for MBMS common control information, i.e. the MCCH. E-UTRA employs one MCCH logical channel per MBSFN area. In case the network configures multiple MBSFN areas, the UE acquires the MBMS control information from the MCCHs that are configured to identify if services it is interested to receive are ongoing. The action applicable when the UE is unable to simultaneously receive MBMS and unicast services is up to UE implementation. An MBMS capable UE may be only required to support reception of a single MBMS service at a time, and reception of more than one MBMS service (also possibly on more than one MBSFN area) in parallel is left for UE implementation. The MCCH carries the MBSFNAreaConfiguration message, which indicates the MBMS sessions that are ongoing as well as the (corresponding) radio resource configuration. The MCCH may also carry the MBMSCountingRequest message, when E-UTRAN wishes to count the number of UEs in RRC_CONNECTED that are receiving or interested to receive one or more specific MBMS services.

A limited amount of MBMS control information is provided on the BCCH. This primarily concerns the information needed to acquire the MCCH(s). This information is carried by means of a single MBMS specific SystemInformationBlock, i.e. SystemInformationBlockType13. An MBSFN area is identified solely by the mbsfn-AreaId in SystemInformationBlockType13. At mobility, the UE considers that the MBSFN area is continuous when the source cell and the target cell broadcast the same value in the mbsfn-AreaId.

Table 1 shows an example of the SystemInformationBlockType13 information element (IE). The SystemInformationBlockType13IE contains the information required to acquire the MBMS control information associated with one or more MBSFN areas.

TABLE 1

-- ASN1STARTSystemInformationBlockType13-r9 ::= SEQUENCE {mbsfn-AreaInfoList-r9 MBSFN-AreaInfoList-r9,notificationConfig-r9 MBMS-NotificationConfig-r9,lateNonCriticalExtension OCTET STRING OPTIONAL,...}-- ASN1STOP Referring to Table 1, the SystemInformationBlockType13IE includes MBSFN-AreaInfoList IE. Table 2 shows an example of the MBSFN-AreaInfoList IE. The IE MBSFN-AreaInfoList contains the information required to acquire the MBMS control information associated with one or more MBSFN areas.

TABLE 2

-- ASN1STARTMBSFN-AreaInfoList-r9 ::= SEQUENCE (SIZE(1..maxMBSFN-Area)) OF MBSFN-AreaInfo-r9MBSFN-AreaInfo-r9

TABLE 2-continued

```
::=           SEQUENCE {mbsfn-AreaId-r9              INTEGER
(0..255),     non-MBSFNregionLength            ENUMERATED {s1, s2},
notificationIndicator-r9        INTEGER (0..7),         mcch-
Config-r9           SEQUENCE {      mcch-Repeti-
tionPeriod-r9       ENUMERATED {rf32, rf64, rf128, rf256},    mcch-
Offset-r9           INTEGER (0..10),           mcch-Modi-
ficationPeriod-r9   ENUMERATED {rf512, rf1024},     sf-
AllocInfo-r9              BIT STRING (SIZE(6)),     sig-
nallingMCS-r9           ENUMERATED {n2, n7, n13, n19}    },
...}-- ASN1STOP
```

Referring to Table 2, the mbsfn-AreaId field indicates the MBSFN area ID. The mcch-MochficationPeriod field defines periodically appearing boundaries, i.e. radio frames for which SFN mod mcch-ModificationPeriod=0. The contents of different transmissions of MCCH information can only be different if there is at least one such boundary in-between them. The mcch-Offset field indicates, together with the mcch-RepetitionPeriod, the radio frames in which MCCH is scheduled i.e. MCCH is scheduled in radio frames for which: SFN mod mcch-RepetitionPeriod=mcch-Offset. The mcch-RepetitionPeriod field defines the interval between transmissions of MCCH information, in radio frames. The non-MBSFNregionLength field indicates how many symbols from the beginning of the subframe constitute the non-MBSFN region. This value applies in all subframes of the MBSFN area used for PMCH transmissions as indicated in the MSI. The notificationIndicator field indicates which PDCCH bit is used to notify the UE about change of the MCCH applicable for this MBSFN area. The sf-AllocInfo field indicates the subframes of the radio frames indicated by the mcch-RepetitionPeriod and the mcch-Offset, which may carry MCCH. The signallingMCS field indicates the modulation and coding scheme (MCS) applicable for the subframes indicated by the field sf-AllocInfo and for each (P)MCH that is configured for this MBSFN area, for the first subframe allocated to the (P)MCH within each MCH scheduling period (which may contain the MCH scheduling information provided by MAC).

The MCCH information is transmitted periodically, using a configurable repetition period. Scheduling information is not provided for MCCH, i.e. both the time domain scheduling as well as the lower layer configuration are semi-statically configured, as defined within SystemInformationBlockType13.

For MBMS user data, which is carried by the MTCH logical channel, E-UTRAN periodically provides MCH scheduling information (MSI) at lower layers (MAC). This MCH information only concerns the time domain scheduling, i.e. the frequency domain scheduling and the lower layer configuration are semi-statically configured. The periodicity of the MSI is configurable and defined by the MCH scheduling period.

The UE applies the MCCH information acquisition procedure to acquire the MBMS control information that is broadcasted by the E-UTRAN. The procedure applies to MBMS capable UEs that are in RRC_IDLE or in RRC_CONNECTED. A UE interested to receive MBMS services shall apply the MCCH information acquisition procedure upon entering the corresponding MBSFN area (e.g. upon power on, following UE mobility) and upon receiving a notification that the MCCH information has changed. A UE that is receiving an MBMS service shall apply the MCCH information acquisition procedure to acquire the MCCH, which corresponds with the service that is being received, at the start of each modification period. Unless explicitly stated otherwise, the MCCH information acquisition procedure overwrites any stored MCCH information, i.e. delta configuration is not applicable for MCCH information and the UE discontinues using a field if it is absent in MCCH information unless explicitly specified otherwise.

An MBMS capable UE shall:
1> if the procedure is triggered by an MCCH information change notification:
2> start acquiring the MBSFNAreaConfiguration message and the MBMSCountingRequest message if present, from the beginning of the modification period following the one in which the change notification was received;

The UE continues using the previously received MCCH information until the new MCCH information has been acquired.
1> if the UE enters an MBSFN area:
2> acquire the MBSFNAreaConfiguration message and the MBMSCountingRequest message if present, at the next repetition period;
1> if the UE is receiving an MBMS service:
2> start acquiring the MBSFNAreaConfiguration message and the MBMSCountingRequest message if present, that both concern the MBSFN area of the service that is being received, from the beginning of each modification period;

No UE requirements related to the contents of this MBSFNAreaConfiguration apply other than those specified elsewhere, e.g. within procedures using the concerned system information, the corresponding field descriptions. Upon receiving MBMSCountingRequest message, the UE shall perform the MBMS counting procedure.

A low complexity machine-type communication (MTC) UE is described. The low complexity MTC UE may be called different names, such as a low complexity UE, a low cost UE, category 0 UE, etc. The low complexity MTC UE indicates UE category 0 and supports the following:

Single receive antenna;
DL and UL maximum transport block size (TBS) of 1000 bits for unicast transmission on PDSCH and PUSCH with the corresponding layer 2 buffer size;

The low complexity MTC UE may optionally support enhanced MBMS (eMBMS) and if it supports eMBMS, it shall support a TBS size for MBMS reception of [10296] as category 1. The low complexity MTC UE may access a cell only if system information block type 1 (SIB1) indicates that access of low complexity MTC UEs is allowed. If the cell does not support low complexity MTC UEs, a low complexity MTC UE considers the cell as barred and should not camp on it. The eNB may determine that a UE is a low complexity MTC UE based on the UE capability.

As described above, the low complexity UE may optionally support MBMS service reception. The usage for MBMS service for the low complexity UE may include firmware upgrade, application software upgrade, etc. The MBMS services to which low complexity UE is interested may be usually common to other normal UE, while the MBMS services to which normal UE is interested is usually not interesting to the low complexity UE. Thus, it may be expected that the MBSFN area for MBMS services for the low complexity UE is differentiated from the MBSFN area for MBMS services for normal UE. In this sense, it may be helpful for the low complexity UE to easily determine the interested MBSFN area for the low complexity UE, since operating in battery efficient way is especially important for the low complexity UE.

In order to solve the problem described above, a method for indicating usage of an MBSFN area according to an embodiment of the present invention may be proposed. According to an embodiment of the present invention, an identifier indicating the usage of MBSFN area may be provided via system information. The identifier may indicate that the MBSFN area is for one of followings in terms of UE aspect:

Low complexity/cost UE
Category 0 UE

Or, the identifier may indicate that the MBSFN area is for one of followings in terms of service aspect:

MTC
Device-to-device (D2D) discovery/communication
Group communication system enablers (GCSE)
Public safety Upon receiving the identifier for the usage of MBSFN area, the UE may read the MCCH corresponding to the MBSFN area providing interested MBMS service. The UE may not need to read the MCCH which is not related to the interested MBMS services unnecessarily, so that the UE may save the power and receive the interested MBMS service more quickly.

The identifier indicating the usage of MBSFN area may be included in the MBSFN-AreaInfoList IE, which is described above in Table 2. As described above, MBSFN-AreaInfoList IE may be included in the SystemInformation-BlockType13 IE. Table 3 shows an example of the MBSFN-AreaInfoList IE according to an embodiment of the present invention.

low complexity/cost UE. The identifier indicating usage of MBSFN area 1 may indicate that the MBSFN area 1 is for low complexity/cost UE. The identifier indicating usage of MBSFN area 2 may indicate that the MBSFN area 2 is for public safety. In step S110, upon receiving the SIB13, the low complexity/cost UE determines the MBSFN area for the low complexity/cost UE.

In step S120, the eNB transmits a MCCH for MBSFN area 1 to the low complexity/cost UE. Since the MBSFN area 1 is for low complexity/cost UE, in step S121, the UE reads the MCCH for MBSFN area 1. On the other hand, in step S130, the eNB transmits a MCCH for MBSFN area 2 to the low complexity/cost UE. Since the MBSFN area 2 is for public safety, in step S131, the UE skips reading the MCCH for MBSFN area 2. That is, the UE may only read the MCCH which corresponds to the MBSFN area providing the interested MBMS services quickly.

FIG. 8 shows another example of a method for indicating usage of an MBSFN area according to an embodiment of the present invention.

In step S200, the UE receives system information including an identifier indicating usage of an MBSFN area. The UE may be one of a low complexity UE, a lost complexity MTC UE, a low cost UE, or a category 0 UE. The system information may be a SIB13. The usage of the MBSFN area may include at least one of low complexity/cost UE, D2D discovery/communication, GCSE, or public safety.

In step S210, the UE determines whether to read a MCCH corresponding to the MBSFN area according to the received identifier. The UE may read the MCCH corresponding to the MBSFN area when it is determined to read the MCCH corresponding to the MBSFN area. It may be determined to read the MCCH corresponding to the MBSFN area, when the usage of the MBSFN area corresponds to a low complexity/cost UE. The MBSFN area may provide an MBMS service to which the UE is interested.

Consequently, the UE may only read the MCCH corresponding to MBSFN area which provides the interested MBMS services quickly. Accordingly, the UE may not need to unnecessarily read the MCCH corresponding to the MBSFN area which does not provide interested MBMS services.

TABLE 3

```
-- ASN1STARTMBSFN-AreaInfoList-r9 ::= SEQUENCE
(SIZE(1..maxMBSFN-Area)) OF MBSFN-AreaInfo-r9MBSFN-AreaInfo-r9
::=                  SEQUENCE {mbsfn-AreaId-r9                       INTEGER
(0..255),        non-MBSFNregionLength          ENUMERATED {s1, s2},
notificationIndicator-r9                 INTEGER (0..7),  mcch-
Config-r9                        SEQUENCE {  mcch-Repeti-
tionPeriod-r9           ENUMERATED {rf32, rf64, rf128, rf256},             mcch-
Offset-r9                    INTEGER (0..10),    mcch-Modi-
ficationPeriod-r9           ENUMERATED {rf512, rf1024},           sf-
AllocInfo-r9                   BIT STRING (SIZE(6)),           sig-
nallingMCS-r9                ENUMERATED {n2, n7, n13, n19}     }, Us-
ageofMbsfn-area ENUMERATED {low cost, GCSE, public safety, ...}        ... }--
ASN1STOP
```

Referring to Table 3, the MBSFN-AreaInfoList IE newly includes the UsageofMbsfn field, which indicates the usage of the MBSFN area to which the low complexity UE is interested. The usage of the MBSFN area may indicate one of low complexity/cost UE, GCSE, or public safety.

FIG. 7 shows an example of a method for indicating usage of an MBSFN area according to an embodiment of the present invention.

In step S100, the eNB transmits the SIB13 which includes an identifier indicating usage of each MBSFN area to the FIG. 9 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for indicating, by a user equipment (UE), usage of a multicast-broadcast single-frequency network (MBSFN) area in a wireless communication system, the method comprising:

receiving system information including an identifier indicating usage of an MBSFN area, wherein the usage of the MBSFN area indicates a specific type of service;

determining whether to read a multicast control channel (MCCH) corresponding to the MBSFN area according to the received identifier;

reading the MCCH corresponding to the MBSFN area, when a service that the UE is interested to receive is identical to the specific type of service indicated by the identifier; and skipping to read the MCCH corresponding to the MBSFN area, when the service that the UE is interested to receive is not identical to the specific type of the service indicated by the identifier, wherein the specific type of service indicates at least one of machine-type communication (MTC), device-to-device (D2D) discovery/communication, group communication system enablers (GCSE), or public safety.

2. The method of claim 1, wherein the system information is a system information block type 13 (SIB13).

3. The method of claim 1, wherein the MBSFN area provides an MBMS service to which the UE is interested.

4. A user equipment (UE) comprising:

a memory;

a transceiver; and a processor coupled to the memory and the transceiver, and configured to:

control the transceiver to receive system information including an identifier indicating usage of a multicast-broadcast single-frequency network (MBSFN) area, wherein the usage of the MBSFN area indicates a specific type of service;

determine whether to read a multicast control channel (MCCH) corresponding to the MBSFN area according to the received identifier;

read the MCCH corresponding to the MBSFN area, when a service that the UE is interested to receive is identical to the specific type of service indicated by the identifier; and skip to read the MCCH corresponding to the MBSFN area, when the service that the UE is interested to receive is not identical to the specific type of the service indicated by the identifier, wherein the specific type of service indicates at least one of machine-type communication (MTC), device-to-device (D2D) discovery/communication, group communication system enablers (GCSE), or public safety.

5. The UE of claim 4, wherein the system information is a system information block type 13 (SIB13).

* * * * *